(12) United States Patent
Miller et al.

(10) Patent No.: US 7,111,886 B1
(45) Date of Patent: Sep. 26, 2006

(54) PIVOTING CAGE CARGO RETAINER FOR PICK-UP TRUCKS

(75) Inventors: Scott Miller, Canton, MI (US);
Kian-Huat Tan, Westland, MI (US);
Nelson Roos, Charlottesville, VA (US);
Jerry W. Srutwa, Huntsville (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/235,893

(22) Filed: Sep. 27, 2005

Related U.S. Application Data

(63) Continuation-in-part of application No. 10/969,417, filed on Oct. 20, 2004.

(60) Provisional application No. 60/515,066, filed on Oct. 28, 2003.

(51) Int. Cl.
*B62D 33/023* (2006.01)

(52) U.S. Cl. .................................. 296/26.11; 296/57.1

(58) Field of Classification Search ............. 296/26.08, 296/26.11, 57.1, 51
See application file for complete search history.

(56) References Cited

U.S. PATENT DOCUMENTS

| | | | |
|---|---|---|---|
| 5,147,103 A | 9/1992 | Ducote | 296/37.6 |
| 5,253,913 A | 10/1993 | Metivier | 296/37.6 |
| 5,468,038 A * | 11/1995 | Sauri | 296/26.11 |
| 5,700,047 A | 12/1997 | Leitner | 296/26 |
| D417,859 S | 12/1999 | Leitner | D12/414 |
| D418,106 S | 12/1999 | Leitner | D12/414 |
| 6,019,410 A * | 2/2000 | Trostle et al. | 296/26.11 |
| 6,113,173 A | 9/2000 | Leitner | 296/26.11 |
| 6,364,392 B1 | 4/2002 | Meinke | 296/62 |
| 6,402,215 B1 | 6/2002 | Leitner | 296/26.11 |
| 6,425,618 B1 * | 7/2002 | Garland et al. | 296/26.11 |
| 6,454,338 B1 | 9/2002 | Glickman | 296/57.1 |
| 6,540,123 B1 | 4/2003 | Kmita | 224/403 |
| 6,626,478 B1 * | 9/2003 | Minton | 296/26.11 |
| 6,805,392 B1 | 10/2004 | Leitner | 296/26.08 |
| 2002/0153737 A1 * | 10/2002 | Fitts | 296/26.11 |
| 2003/0030295 A1 * | 2/2003 | Brown et al. | 296/26.08 |
| 2005/0012354 A1 | 1/2005 | Leitner | 296/26.08 |

* cited by examiner

*Primary Examiner*—Jason Morrow
(74) *Attorney, Agent, or Firm*—Gigette M. Bejin; Miller Law Group, PLLC

(57) ABSTRACT

A pivoting cage cargo bed extender is pivotally mounted to the D-pillars of a pick-up truck to be pivotally movable between a forward position and a rearward position. In the rearward position, the pivoting cage serves as a supplemental tailgate structure that rests on the open tailgate to extend the operative area of the cargo bed. The pivoting cage is formed of individual segments that are hinged together and separable at the center into two halves that are each collapsible into a stowed position adjacent the respective side wall of the cargo bed. The two halves of the cargo bed are connectable with a latching mechanism at the center to form a pivoting cage structure that spans transversely across the floor of the cargo bed. The latching mechanism compresses an internal O-ring to provide a tight connection between the two halves.

20 Claims, 9 Drawing Sheets

PIVOTING CAGE CARGO RETAINER FOR PICK-UP TRUCKS

CROSS-REFERENCE TO RELATED APPLICATIONS

This application is a continuation-in-part of U.S. patent application Ser. No. 10/969,417, filed on Oct. 20, 2004, which claims domestic priority on U.S. Provisional Patent Application Ser. No. 60/515,066, filed on Oct. 28, 2003, the contents of both patent applications being incorporated herein by reference.

FIELD OF THE INVENTION

This invention relates to the containment of cargo on pick-up trucks and, more particularly, to a pivoting cage apparatus that can be positioned on the opened tailgate to expand the cargo area of the bed.

BACKGROUND OF THE INVENTION

Conventionally, pickup trucks include a tailgate at the back of a bed that closes off a cargo box. Often times, the truck bed is not long enough to hold the cargo, so truck bed extenders have been developed. The truck bed extenders work in conjunction with the open tailgate in order to provide additional length to the bed. Some of the bed extenders mount to the outside of the tailgate or to the box itself, which may be convenient for deployment, but they tend to interfere with cargo space in the box since the bed extender, when not in use, protrudes into the box. Moreover, it is typical for the vehicle operator to employ the extender only occasionally, so it is generally undesirable to have the extender exposed at all times, which detracts from the attractiveness of the vehicle.

Additionally, it is sometimes desirable to have an extender that can provide other functions in addition to a bed extender, such as a box extender function—an upwardly extending structure from the rearmost edge of an open tailgate that mimics the function of a closed tailgate. Such arrangements are particularly useful for carrying a load that is longer than the bed, but needs rearward support like a closed tailgate provides in order to prevent the load from falling backwards off the truck. Again, though, typical box extenders that provide adequate functionality are externally mounted and not only detract from the vehicle appearance when not in use but also require changes to the box for mounting such extenders. Also, most of these types of extenders are very cumbersome to deploy and later stow away, thus being undesirable for the operator to use. Such functions may be provided with simple ergonomic operation of the assembly, while still allowing for an attractive appearance for the vehicle when the extender is stowed during periods of non-use. Thus, while the exterior mounted extenders may be able to perform multiple functions, they still suffer from the drawbacks of an unattractive appearance and taking up room in the bed even when not in use.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Positioning the extended supplemental tailgate structure generally perpendicularly to the plane of the main tailgate structure, while the main tailgate structure is moved to an open position such that the plane of the tailgate structure is substantially parallel to the bed of the pickup truck, places the extended supplemental tailgate structure in an orientation that is substantially parallel to the main tailgate structure when the main tailgate structure is in a normal closed position. In such an extended position, the supplemental tailgate can provide a restriction to the rearward movement of objects located on the bed of the pickup truck. Furthermore, such an extended position of the supplemental tailgate can provide support for objects placed on top of the supplemental tailgate. The extended supplemental tailgate, however, has a limited support structure on the main tailgate and would have enhanced stability if support members were provided to extend between the extended supplemental tailgate and the body of the pickup truck.

The utilization of a pivoting cage as an apparatus for restraining cargo on the bed of pick-up trucks is disclosed in U.S. Pat. No. 6,540,123, issued to Gerard Kmita, et al on Apr. 1, 2003, wherein a cage assembly is mounted to the D-pillar of the pick-up truck to be movable between a position resting on the opened tailgate and a position resting on the bed to form an enclosed compartment between the cage and the closed tailgate. This fixed cage is also movable into a folded orientation against the tailgate when storage is desired by folding the side pieces against the end piece. Such a storage position for the cage structure will reduce the overall available length of the cargo bed for utilization.

In U.S. Pat. No. 6,805,392, issued to Horst Leitner, et al on Oct. 19, 2004, a pivoting cage is disclosed for use as a supplemental tailgate and as a cargo retaining apparatus, depending on which pivoted position the cage is oriented. The cage is of a fixed configuration spanning transversely between the side walls of the cargo bed and is pivotally attached to the side walls of the cargo bed for movement between the two orientations. Storage of the cage structure is accomplished by removing the cage from the cargo bed and placing it somewhere remotely from the vehicle. Convenient storage of the cage apparatus cannot be accomplished without removal of the cage apparatus from the vehicle. If large cargo items need to be loaded into the cargo bed, this cage apparatus would have to be removed and cannot be conveniently stored.

A cage storage device can be found in U.S. Pat. No. 5,147,103, granted to Wayne Ducote on Sep. 15, 1992, in which a top wall is supported on the top rails of the side walls, while a rearward cage wall extends transversely between the side walls to define a caged storage area at the forward portion of the cargo bed. This cage structure is not pivotal or movable into different orientations. In U.S. Pat. No. 5,253,913, granted on Oct. 19, 1993, a cage-like netting is mounted on a pivoted bar to be movable between a lowered position defining a cargo retaining area between the netting and the front wall of the cargo bed. This pivoted device cannot be positioned in conjunction with the tailgate to provide a supplemental tailgate apparatus, or provide a folded storage configuration.

Supplemental tailgate devices are found in U.S. Pat. No. 6,364,392, issued to Joseph Meinke on Apr. 2, 2002, and in U.S. Pat. No. 6,454,338, issued to David Glickman on Sep. 24, 2002. Such supplemental tailgate devices can be selectively deployed from a storage position housed internally of the tailgate to an upright, operative position, which in conjunction with the lowered tailgate provides an extended cargo bed area that encompasses the floor of the cargo bed and the contiguous top surface of the tailgate. Such supplemental tailgate devices, however, can only restrain cargo passing directly rearwardly over the tailgate. Any cargo that would be loosely positioned on the cargo bed would be able to pass diagonally off the tailgate without encountering the supplemental tailgate device. Furthermore, loose cargo items having a small size can also pass rearwardly through these supplemental tailgate devices.

Accordingly, it would be desirable to provide a cargo bed extending device that is in the form of a pivoting cage, yet can be conveniently configured into a storage position that would permit the utilization of the full length of the cargo bed, while allowing the pivoting cage to be deployed transversely across the cargo bed as needed.

SUMMARY OF THE INVENTION

It is an object of this invention to overcome the aforementioned disadvantages of the known prior art by providing a pivoting cage supplemental tailgate apparatus that can be stored along the sidewalls of the cargo bed in a stowed configuration.

It is a feature of this invention that the pivoting cage apparatus when stored against the lateral side walls of the cargo bed allows the full length of the cargo bed to be utilized.

It is another feature of this invention that the pivoting cage is formed of hinged segments that are pivotally attached to the opposing D-pillars of the pick-up truck.

It is an advantage of this invention that the hinged segments are stored against both opposing side walls of the cargo bed in a stowed configuration.

It is another advantage of this invention that the opposing hinged segments are connectable at the center of the pivoting cage by a detachable latching mechanism to form a cage structure the spans transversely across the cargo bed.

It is another feature of this invention that the latching mechanism compresses an internal O-ring to provide a tight connection between opposing segments at the center of the pivoting cage.

It is still another feature of this invention that the pivoting cage apparatus can be deployed after cargo is placed on the cargo bed.

It is still another advantage of this invention that the pivoting cage apparatus does not restrict access into the cargo bed for loading cargo thereon.

It is another feature of this invention that the double hinge design allows the cargo cage to be pivoted into deployment without requiring a tonneau cover to be removed.

It is another advantage of this invention that the shape of the individual panels of the pivoting cage apparatus to incorporate slots therein allows the passage of lighting for visibility purposes and reduces wind resistance.

It is yet another feature of this invention that the pivoting cage is positionable on the opened tailgate to extend the capacity of the cargo bed, and positionable on the floor of the cargo bed to provide a separation of the cargo bed into two compartments.

It is still another advantage of this invention that the positioning of the pivoting cage across the floor of the cargo bed of a pick-up truck while the tailgate is in the raised, closed position, allows the pivoting cage to establish a small retained enclosure between the pivoting cage and the raised tailgate to retain small items within the enclosure.

It is still another feature of this invention that the positioning of the pivoting cage across the floor of the cargo bed of a pick-up truck establishes a cargo retainer against the raised tailgate for restraining small amounts of cargo, such as groceries.

It is a further object of this invention to provide a pivoting cage cargo bed extender for a pick-up truck that is durable in construction, inexpensive of manufacture, carefree of maintenance, facile in assemblage, and simple and effective in use.

These and other objects, features and advantages are accomplished according to the instant invention by providing a pivoting cage cargo bed extender that is pivotally mounted to the D-pillars of a pick-up truck to be pivotally movable between a forward position and a rearward position. In the rearward position, the pivoting cage serves as a supplemental tailgate structure that rests on the open tailgate to extend the operative area of the cargo bed. The pivoting cage is formed of individual segments that are hinged together and separable at the center into two halves that are each collapsible into a stowed position adjacent the respective side wall of the cargo bed. The two halves of the cargo bed are connectable with a latching mechanism at the center to form a pivoting cage structure that spans transversely across the floor of the cargo bed. The latching mechanism compresses an internal O-ring to provide a tight connection between the two halves.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
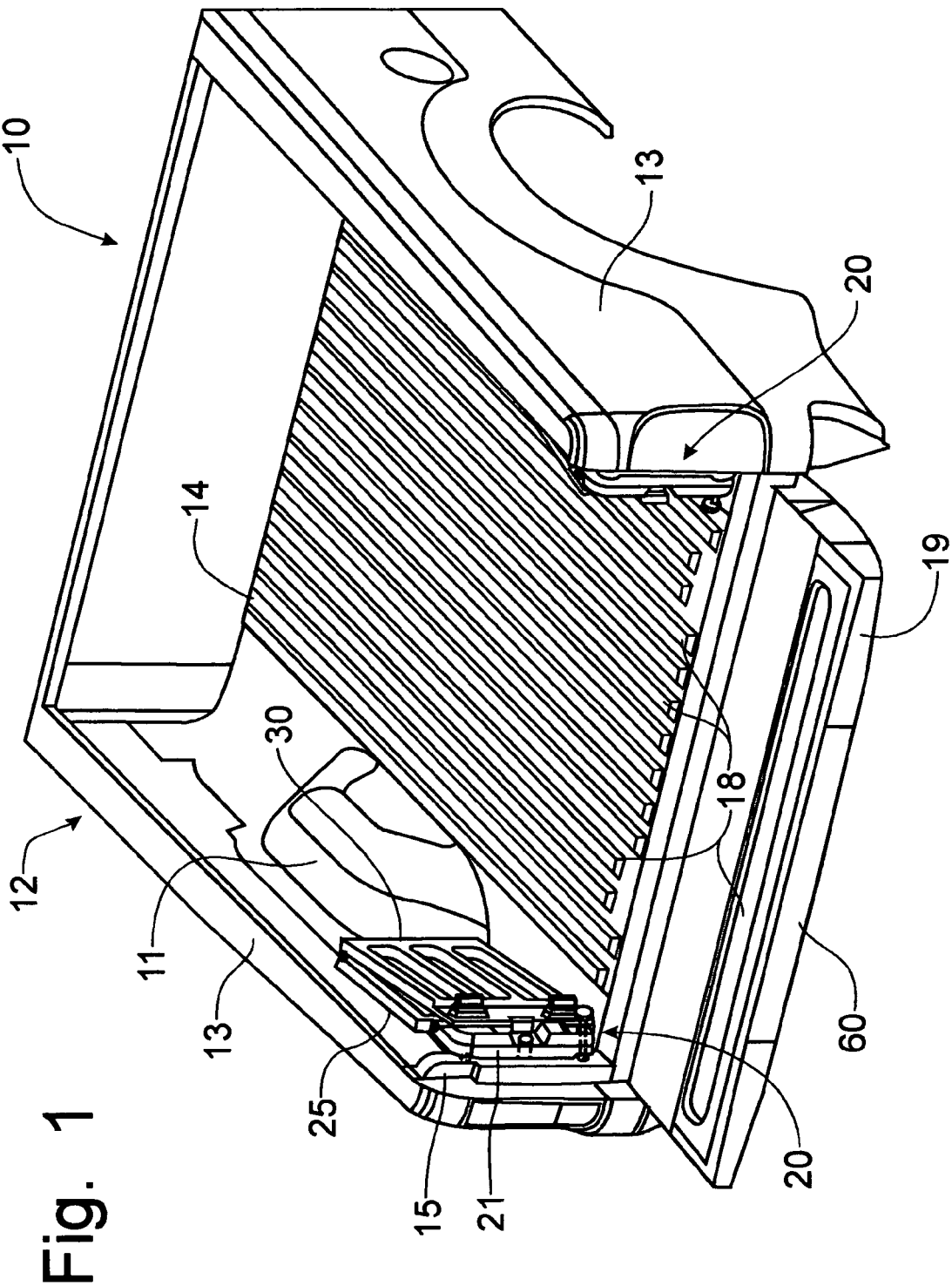
FIG. 1 is an upper, right rear perspective view of a cargo bed of a pick-up truck incorporating the principles of the instant invention, the pivoting cage apparatus being folded into the storage position.
Figure 2:
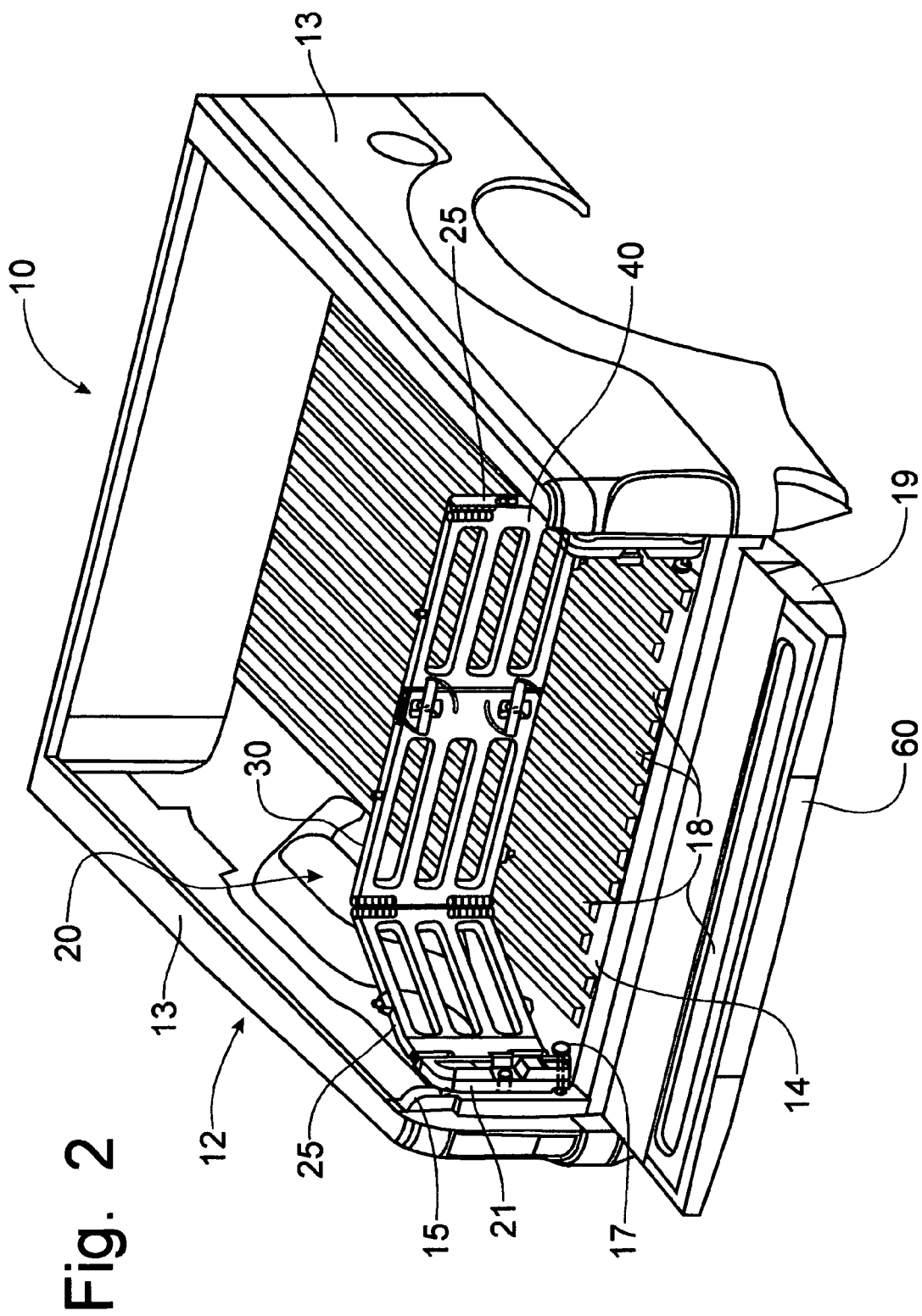
FIG. 2 is a perspective view of a pick-up truck cargo bed similar to that of FIG. 1, but with the pivoting cage apparatus being oriented into an operative configuration extending transversely across the cargo bed.
Figure 3:
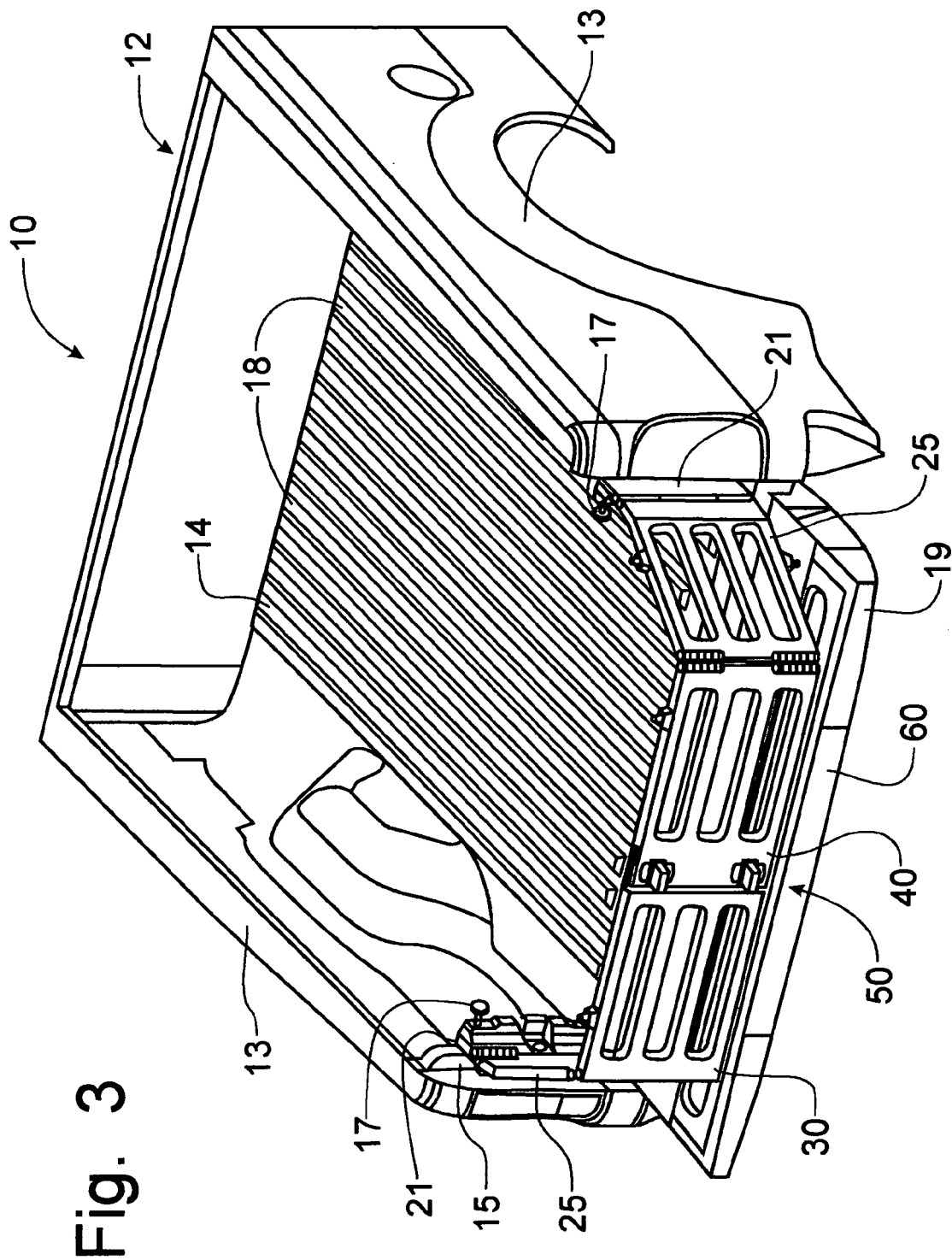
FIG. 3 is a perspective view of a pick-up truck cargo bed similar to that of FIG. 2, but with the pivoting cage apparatus being oriented into an operative configuration extending transversely across the lowered tailgate of the cargo bed.

Referring to FIGS. 1–3, a pick-up truck cargo bed is provided with a pivoting cage apparatus incorporating the principles of the instant invention. Any left and right references are used as a matter of convenience and are determined by standing at the rear of the cargo bed where the tailgate is pivotally mounted and facing the cargo bed, the normal direction of travel of the pick-up truck.

The pick-up truck 10 is conventionally manufactured with a cargo bed 12 forming the rearward portion of the vehicle 10. The cargo bed 12 includes generally vertical, upright side walls 13 having a floor member 14 formed by a floor pan extending generally horizontally therebetween. The frame of the vehicle 10 includes a generally vertical D-pillar 15 located at the rearward end of the cargo bed 12 adjacent the pivoted tailgate 19. The tailgate 19 extends transversely above the floor 14 between the side walls 13 at the rearwardmost portion of the cargo bed 12. The tailgate 19 is pivotally mounted to the floor 14 and is movable between an upright closed position that is oriented perpendicularly to the floor 14 and a lowered open position that forms an extension of the floor 14 rearwardly of the side walls 13, as is shown in the drawings.

A pivoting cage apparatus 20 extends transversely across the floor 14 of the cargo bed 12, as is depicted in FIG. 2, to divide the cargo bed into two separate compartments, one forward of the cage 20 and one between the cage 20 and the tailgate 19, assuming that the tailgate is placed in the closed, upright position. With the tailgate 19 lowered to the open position, the cage 20 is pivotally movable to the position lying transversely across the opened tailgate 19, as is depicted in FIG. 3. When use of the pivoting cage 20 is not desired, the cage 20 can be disassembled and stowed against the side walls 13, as is depicted in FIG. 1.

The cage 20 is formed into two halves, one positionable against the left side wall 13 and the other against the right side wall 13, when placed in the storage position depicted in FIG. 1. Each corresponding half of the cage 20 is formed substantially identically, but mounted generally in mirror image (except for the latching mechanism), as will be described below. Each half of the cage 20 includes a base or mounting member 21 that is pivotally supported on the cargo bed 12. The base member 21 is preferably connected to the D-pillar 15 through a pivot 22 passing through the center of the base member 21. Accordingly, the base member 21 is free to pivot through a 180 degree arc to affect the repositioning of the cage 20 between the positions depicted, respectively, in FIGS. 2 and 3.

The base member 21 has a planar portion 23 that is formed with a hinge 24 for mounting an intermediate panel 25 for pivotal movement about the hinge 24 relative to the base member 21. The intermediate panel 25 is formed with openings 26 therethrough to minimize wind resistance, and with support legs 27 on the top and bottom surfaces for engaging the surface of the floor 14, or alternatively the tailgate 19, so that the support leg 27 can rest between ribs 18 formed on the floor 14 and the tailgate 19 to locate the intermediate panel 25 and prevent transverse movement thereof when deployed out of the storage position and connected to the opposing half of the cage 20. The opposing support legs 27 are preferably formed at respective heights to mate with the surface shape of the floor 14 or tailgate 19 so that the panel 25 will be positioned just above the surface of the floor 14/tailgate 19 to minimize noise transmission.

Each of the respective intermediate panels 25 is also formed with a second hinge 28 to which is pivotally connected a center connecting panel 30, 40. As with the intermediate panels 25, the center connecting panels 30, 40 are formed with openings 32 therethrough, preferably formed as horizontally extending slots, and with support legs 33 on the top and bottom surfaces for positioning in between ribs 18 on the floor 14 and the tailgate 19, depending upon which position the cage 20 is oriented. The center connecting panels 30, 40 are also formed with an overlap portion 35, 45 located at the distal end of the respective center connecting panel 30, 40. The overlap portions 35, 45 have a thickness of approximately half the thickness of the remainder of the corresponding center connecting panel 30, 40 so that when the two opposing overlap portions 35, 45 are place against one another, the total thickness will be substantially uniform with respect to the remainder of the center connecting panels 30, 40.

Figure 5:
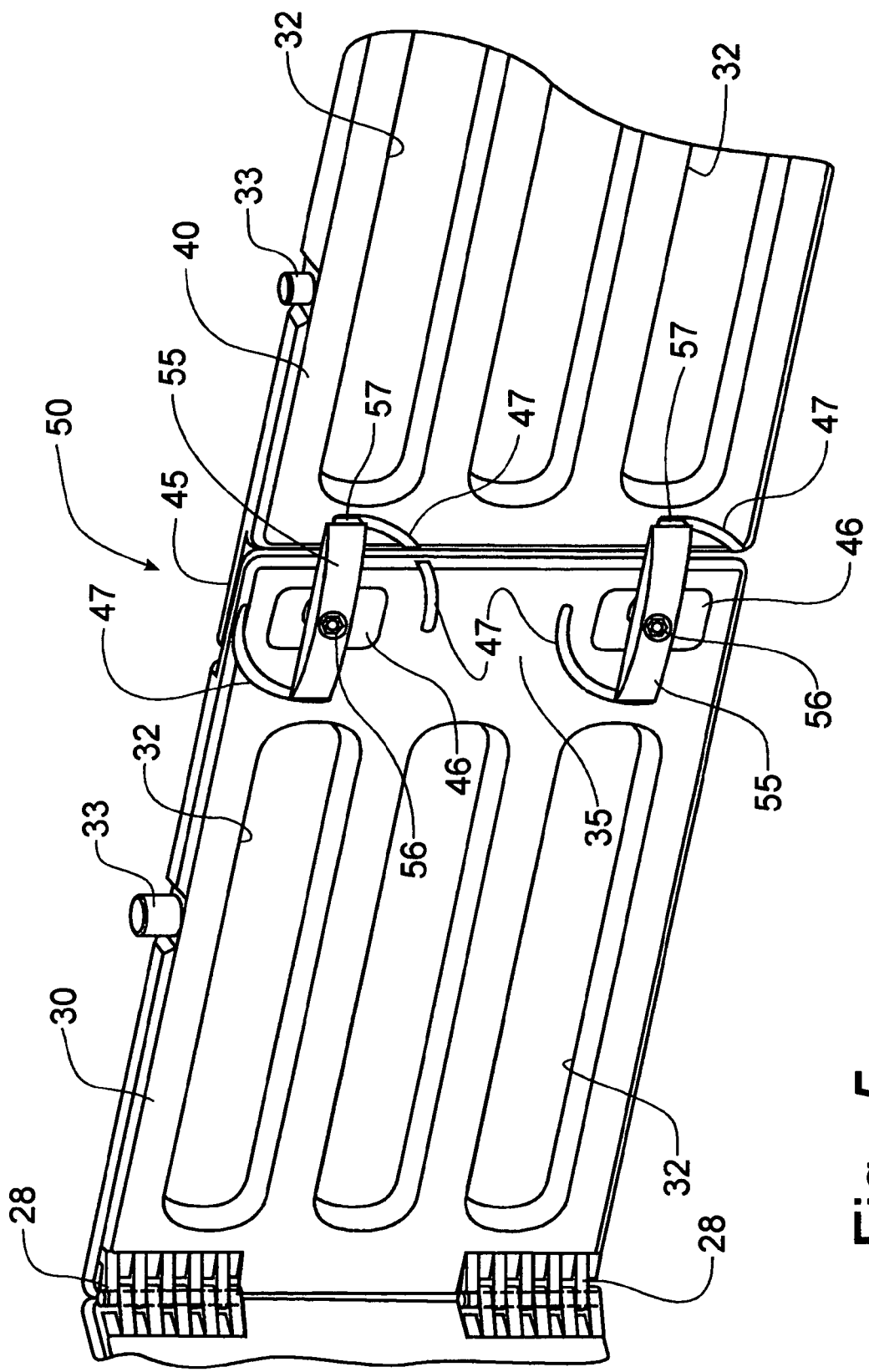
FIG. 5 is an enlarged partial perspective view of the pivoting cage apparatus showing the retainer bracket side of the joinder of the two halves of the pivoting cage apparatus.
Figure 7:
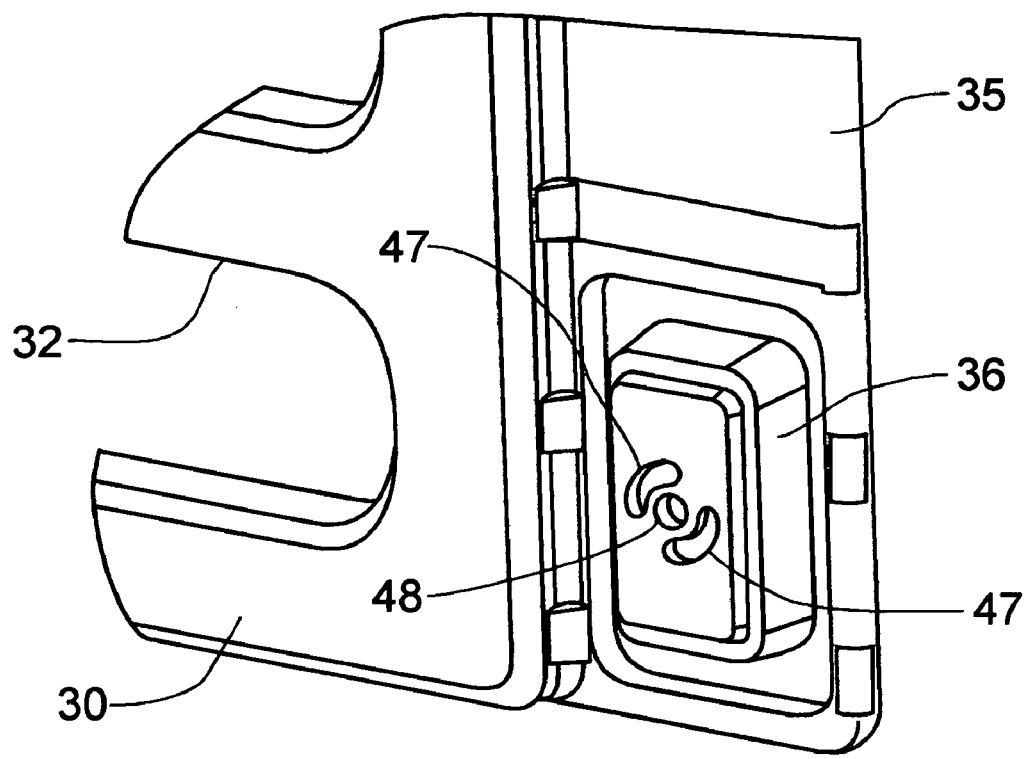
FIG. 7 is an enlarged perspective detail view of the interlocking mounting member on the female side of the pivoting cage apparatus.

One (left) of the center connecting panels 30 is formed with a pair of insert members 36 on the interior surface of the overlap portion 35, as are depicted in FIG. 7, and a pair of quadrant grooves 37 formed into the exterior surface of the overlap portion 35 and preferably extending onto the surface of the other center connecting panel 40, as is best seen in FIG. 5, depending on the dimensions of the overlap portion and the location of the openings 36. These quadrant grooves 37 are located for engagement with a retainer bracket 55 as will be described in greater detail below to enhance the connection between the left and right center connecting panels 30, 40 and to provide a visual indicator as to whether the latching mechanism 50 is latched or unlatched. Each insert member 36 has a generally vertical planar surface into which is formed a second pair of quadrant grooves 47 and a central hole 48. The hole 48 permits the passage of the shaft 53 for the latching mechanism 50 for connecting the left and right center connecting panels together.

The other (right) center connecting panel 40 is formed with a pair of vertically spaced openings 46 through which the insert members 36 can extend from the left center connecting panel 30. Each opening 46 is shaped to mate with the corresponding insert member 36 so that the planar surface becomes substantially aligned with the exterior surface of the right center connecting panel 40.

Figure 4:
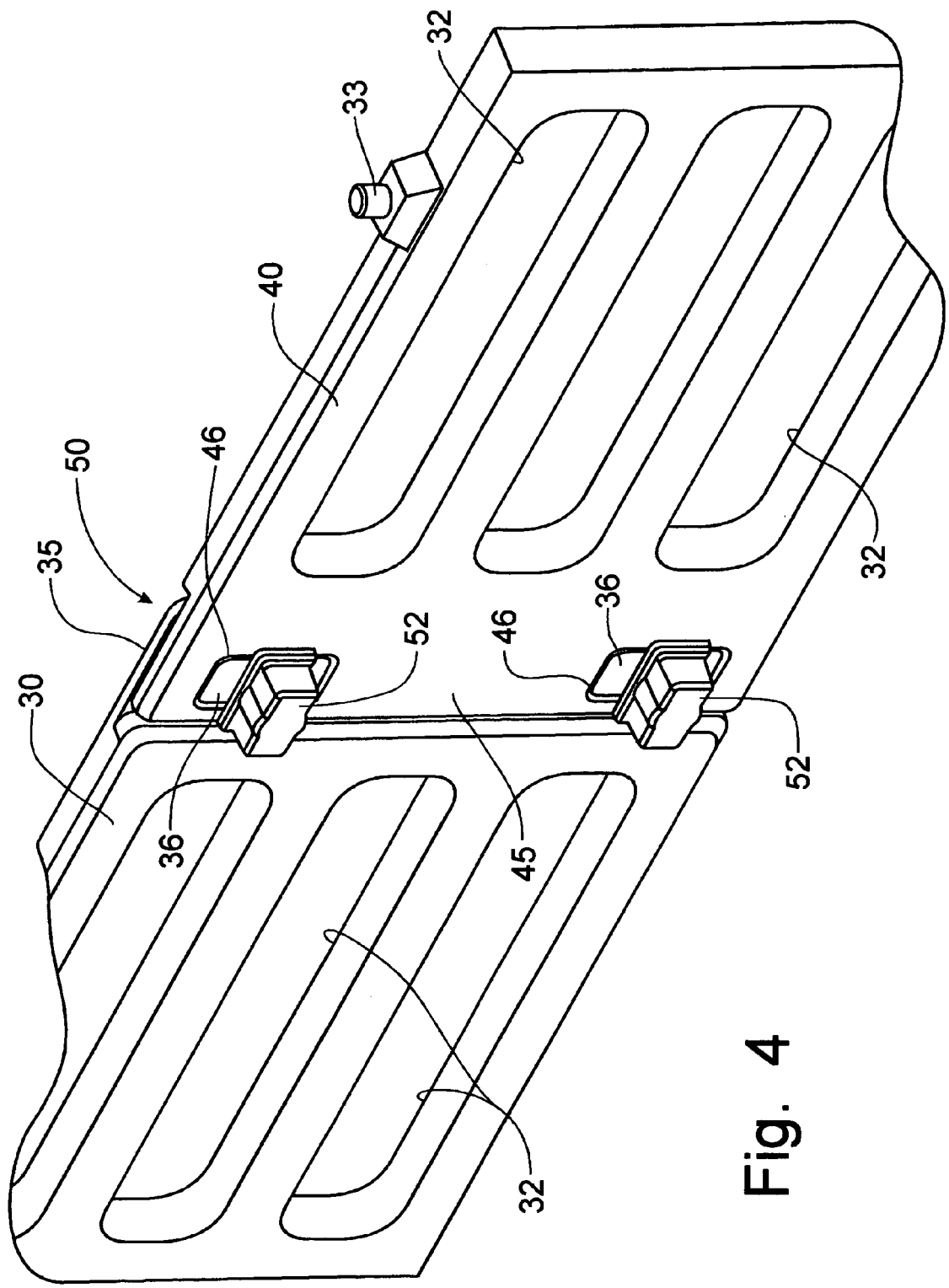
FIG. 4 is an enlarged partial perspective view of the pivoting cage apparatus showing the locking knob side of the joinder of the two halves of the pivoting cage apparatus.
Figure 6:
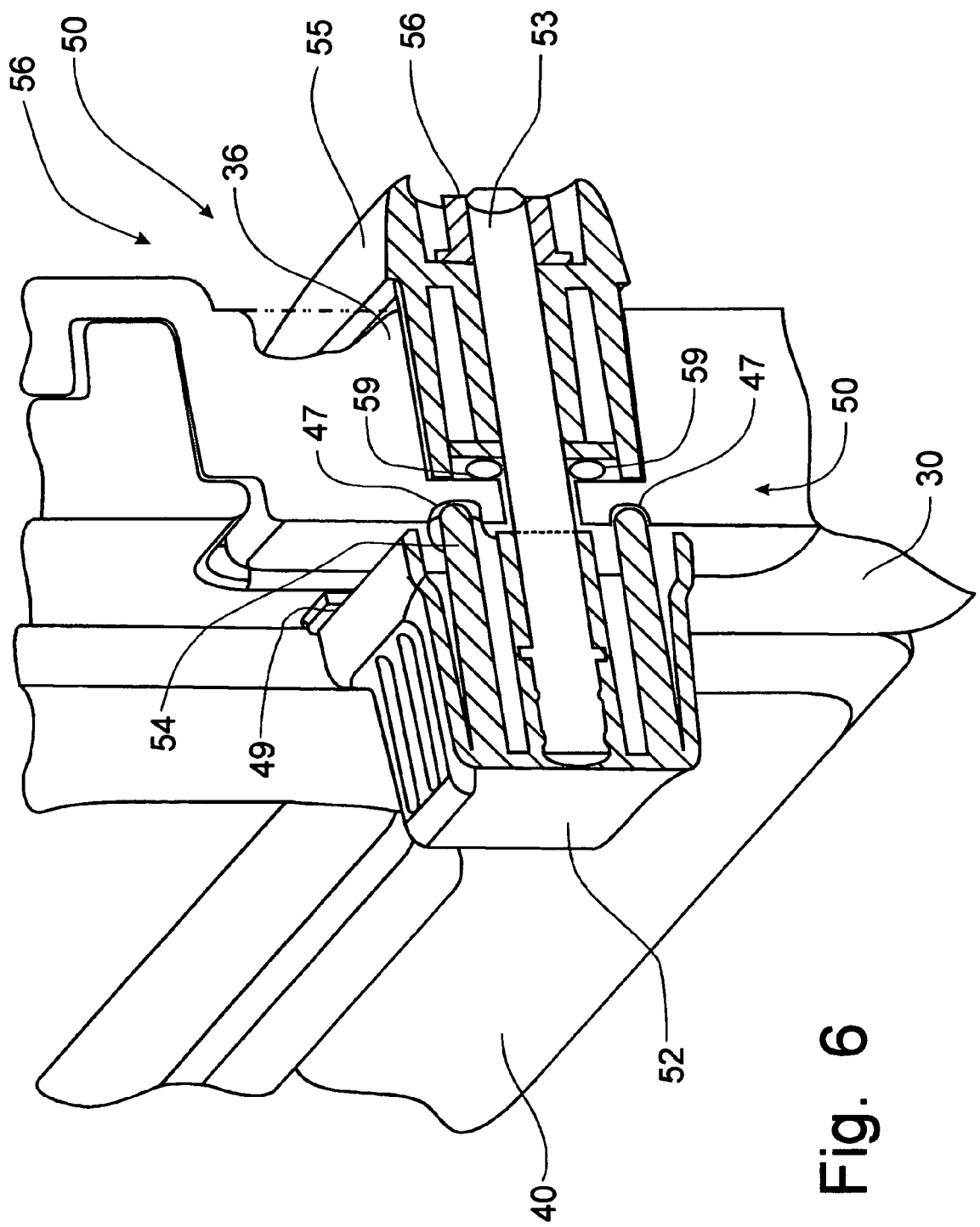
FIG. 6 is an enlarged cross-sectional view through the latching mechanism connecting the two halves of the pivoting cage apparatus.
Figure 8:
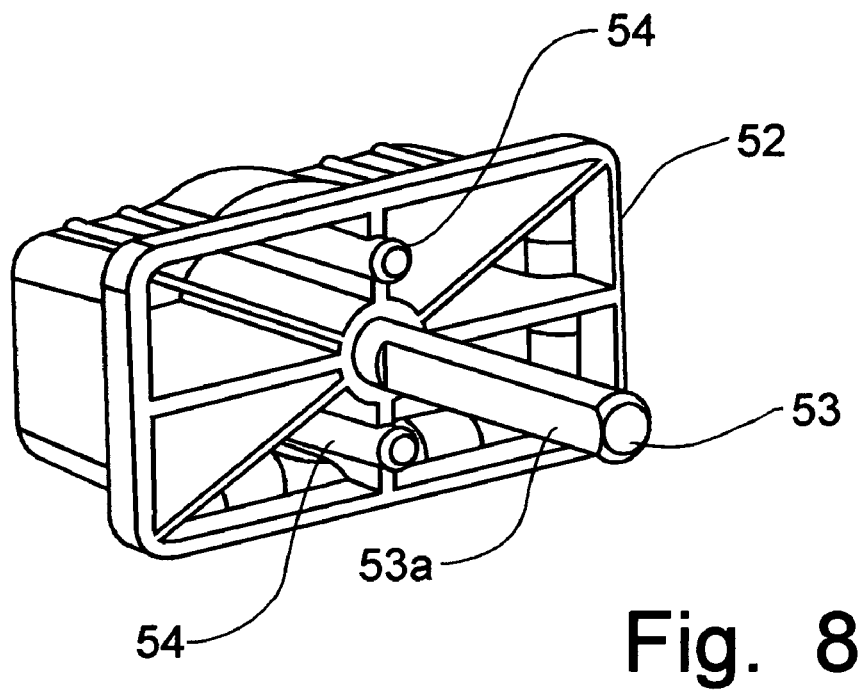
FIG. 8 is an enlarged perspective detail view of the locking knob showing the side of the locking knob adjacent the cage panel to depict the engagement pins.
Figure 9:
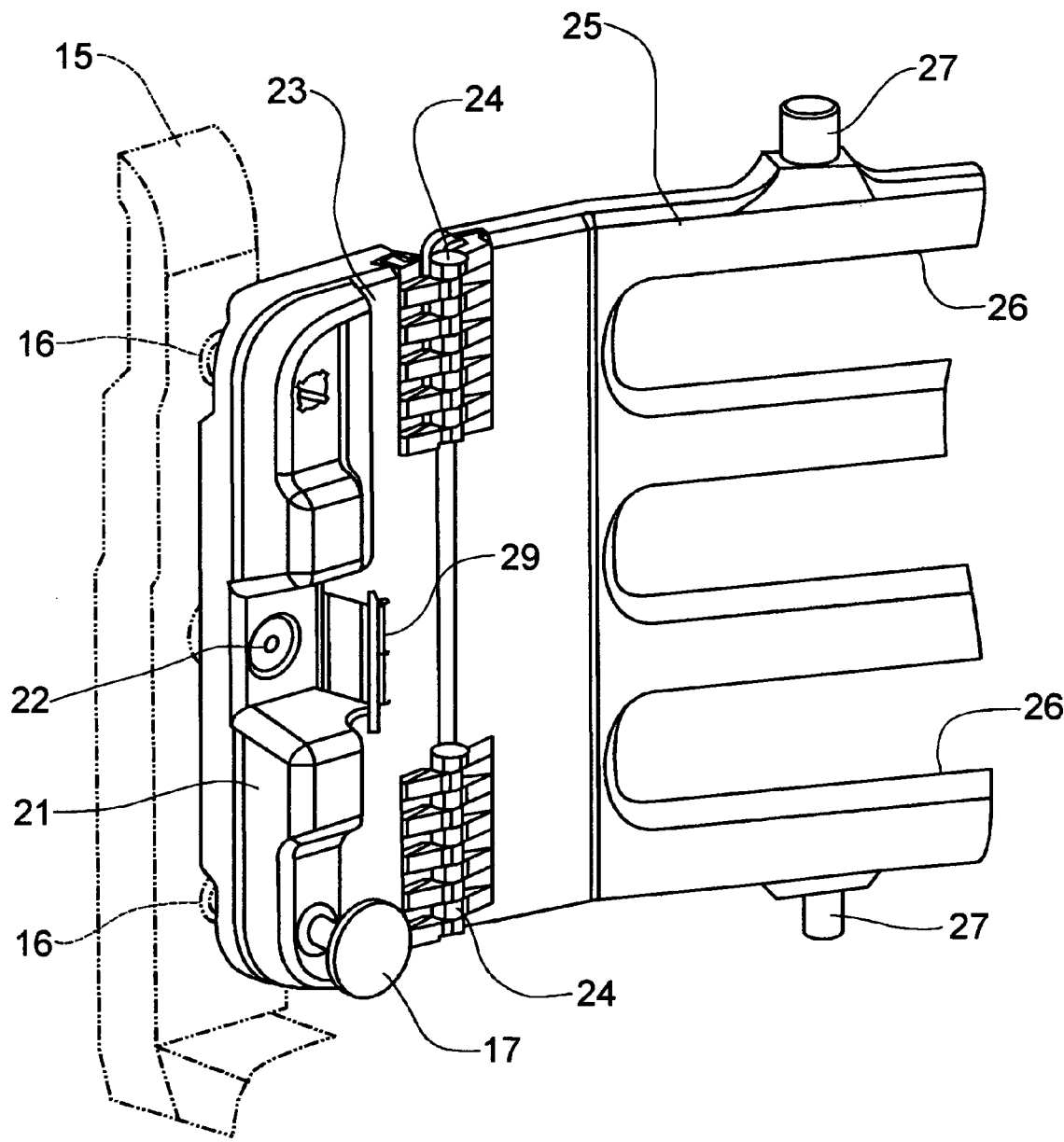
FIG. 9 is an enlarged perspective view of the mounting member pivotally supporting a half of the pivoting cage apparatus on the D-pillar of the pick-up truck cargo bed, the pivoting cage apparatus being depicted in the operative configuration with the D-pillar being shown in phantom.
Figure 10:
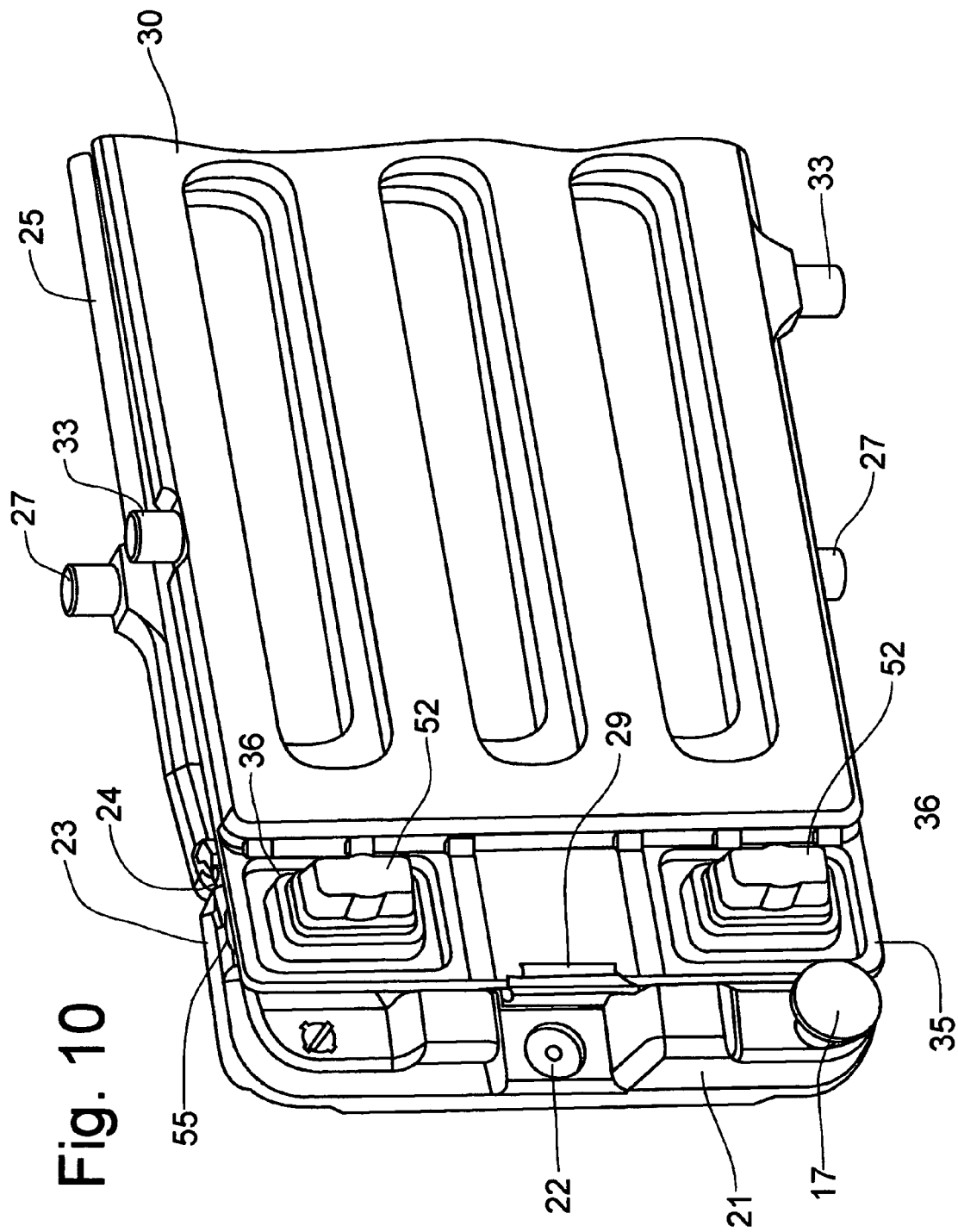
FIG. 10 is an enlarged perspective view of the mounting member similar to that of FIG. 9, but showing the pivoting cage apparatus in the storage position.

The latching mechanism 50 includes a locking knob 52, depicted in FIGS. 4, 6 and 8, from which protrudes a shaft 53 capable of passing through the hole 48 and a pair of engagement pins 54 positioned on opposing sides of the shaft 53 for engagement with the quadrant grooves 47 on the vertical planar surface of the insert members 36. On the opposing side of the overlap portions 35, 45, a retainer bracket 55 is engaged with the shaft 53, and preferably affixed thereto by a nut 56 threaded onto the end of the shaft 53. A flat 53a formed on the shaft 53 requires the retaining bracket 55 and the locking knob 52 to be turned together. The retaining bracket 55 is preferably formed with engagement tabs 57 that are aligned with the first pair of quadrant grooves 37 on the exterior surface of the left center connecting panel 30. The engagement between the engagement pins 54 with the second pair of quadrant grooves 47 and between the engagement tabs 57 and the first pair of quadrant grooves 37 permit the locking knob 52 and retaining bracket 55 to be able to turn only approximately 90 degrees.

When the locking knobs 52 are turned to align vertically with the insert members 36, the locking knobs 52 will pass through the openings 46 and the insert members 36 will move into the openings 46. A ramp 49 formed on opposing sides of each of the openings 46 on the exterior side of the right center connecting panel 40 engages the locking knob 52 when rotated to be perpendicular to the opening 36, thus drawing the two overlap portions 35, 45 into a tight, compressed engagement. Preferably an O-ring 59 positioned between the retainer bracket 55 and the insert member 36, as is depicted in FIG. 6, accommodates the compression exerted by the engagement of the locking knob 52 with the ramps 49 to form a tight connection between the left and right center connecting panels 30, 40.

Once the two halves of the cage 20 are joined together as described above, the entire cage 20 can be pivotally moved between the cargo retaining positions extending transversely across the cargo bed, as depicted in FIG. 2, and the supplemental tailgate position extending transversely across the lowered tailgate 19, as depicted in FIG. 3. The support legs 33 on the top surface in the cargo retaining position become the support legs 33 supporting the cage 20 above the tailgate 19 in the supplemental tailgate position. Pivotal movement of the cage structure 20 turns about the pivot 22 carried by the D-pillar 15. A detent locking pin 17 is carried by the base member 21 and is selectively engagable with aligned openings 16 positioned above and below the pivot 22. A living hinge design on the locking pin 17 provides the detent position. When the cage 20 is in one of the deployed orientations, the locking pin 17 is engaged with one of the openings 16 and engaged with the other of the openings 16 when in the other deployed orientation due to the corresponding pivotal rotation of the base member 21. The openings 16 contain high impact countersunk grommets to reduce rattle.

Each half of the cage 20 is stowable in a storage position, as depicted in FIG. 1, against the corresponding side wall 13 of the cargo bed 12. The intermediate member 25 is folded back toward the side wall 13 about the first hinge 24, while the center connecting panel 30, 40 is rotated about the second hinge 28 against the intermediate panel 25 and engaged with a stow away latch 29 to retain the center connecting panel 30, 40 against the intermediate panel 25. The stow away latch 29 is capable of deflecting to capture the center connecting panel 30, 40 and to allow the release thereof for deploying the cage structure 20. In the storage position, the respective half of the cage structure 20 is positioned against the corresponding side wall in substantial alignment with the wheel well 11 within the cargo bed 12. Therefore, the entire longitudinal length of the cargo bed 12 is available for utilization in hauling cargo.

The cargo beds 12 of pick-up trucks are often covered with a tonneau cover that mounts on the top of the side walls and on the front wall of the cargo bed to form a tight cover. The use of the double hinge design of the cage apparatus 20, the hinge 24 between the base member 21 and intermediate panel 25, along with the second hinge 28 between the intermediate panel 25 and the respective center panel 30, 40, allows each half of the cage 20 to be folded into a position that would permit the rotation of the half of the cage 20 about its pivot 22 without requiring the tonneau cover to be removed. Therefore, the entire cage apparatus 20 can be deployed onto the lowered tailgate 19, with the two center panels 30, 40 connected, without requiring the removal of the tonneau cover.

Preferably, the cage structure, including the base members 21, intermediate members 25, and the center connecting members 30, 40, are formed from durable material such as glass filled plastic, such as nylon, polypropylene and acetal, which can be injection molded or rotational molded into the shape depicted in the drawings. In the alternative, the cage structure 20 can be manufactured from aluminum or other suitable metal to provide durable operative life and a lasting appearance.

The cage structure 20 is also advantageously used in conjunction with a supplemental tailgate assembly 60 of the type shown and described in U.S. patent application Ser. No. 10/969,262, now issued as U.S. Pat. No. 6,966,595, on Nov. 22, 2005, the contents of which are incorporated herein by reference. Such a supplemental tailgate assembly 60 can be stored within the interior of the tailgate 19 until deployed with the tailgate 19 lowered into the open position and the supplemental tailgate assembly 60 oriented generally vertically to serve as a substitute tailgate while the top surface of the lowered tailgate 19 serves as an extension of the cargo bed 12. With the supplemental tailgate assembly 60 raised into the operative vertical position with the tailgate lowered, the cage structure 20 can be pivoted into the rearwardly deployed position extending transversely across the tailgate 19 as is depicted in FIG. 3. The supplemental tailgate assembly 60 with lock rods (not shown) properly deployed would lend further support to the stability of the cage structure 20. Even with the tailgate 19 in the first deployed position depicted in FIG. 2, the supplemental tailgate assembly 60 can help define a compartment of the cargo bed 12 in which cargo can be restrained between the pivoting cage 20 and the supplemental tailgate assembly 60.

One skilled in the art will recognize that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. In a pick-up truck having a frame including an upright D-pillar, a cargo bed defined by opposing lateral upright side walls and a floor extending transversely between the side walls, and a tailgate pivotally supported between said side walls for movement between an upright closed position and a lowered open position, the improvement comprising:
   a pivoting cage apparatus positionable in a collapsed storage position against at least one of said side walls and in a first deployed position extending transversely across said cargo bed, said cage structure being pivotally movable about a generally horizontally extending pivot axis into a second deployed position extending transversely across said tailgate lowered into said open position.

2. The pick-up truck of claim 1 wherein said pivoting cage apparatus is formed in two opposing separable half members positionable in said storage position respectively against both said side walls.

3. The pick-up truck of claim 2 wherein each said half member of said pivoting cage apparatus comprises:
   a base member pivotally mounted for rotation about said pivot axis through approximately 180 degrees;
   an intermediate panel hingedly mounted on said base member for horizontal movement relative to said base member; and
   a center connecting panel hingedly mounted on said intermediate panel for horizontal movement relative to said intermediate panel.

4. The pick-up truck of claim 3 wherein said center connecting panel is rotated against the corresponding said intermediate panel such that a distal end of said center connecting panel is positioned adjacent said base member when in said storage position.

5. The pick-up truck of claim 4 wherein said base member carries a latch member operable to engage said distal end of said center connecting panel when in said storage position.

6. The pick-up truck of claim 3 wherein said opposing center connecting panels are connectable with a latching mechanism to form said first and second deployed positions.

7. The pick-up truck of claim 6 wherein one of said center connecting panels is formed with a pair of vertically spaced openings while the other of said center connecting panels is formed with insert members corresponding to said openings such that said insert members are engaged into said openings when said center connecting panels are connected.

8. The pick-up truck of claim 7 wherein said latching mechanism is operably associated with said insert members and includes:
 a locking knob mounted on each said insert member to be rotatable relative thereto; and
 a retainer bracket mounted on an opposing side of said insert member from said locking knob, said retainer bracket and said locking knob being rotatable through an arc of approximately ninety degrees for selectively positioning said locking knob transversely of the corresponding said opening to connect said center connecting panels into said deployed positions.

9. The pick-up truck of claim 8 wherein the distal end of each said center connecting panel is formed in an overlap region having a thickness approximately half of the remaining portion of the corresponding said center connecting panel so that the joinder of said overlap regions forms a joint having approximately identical thickness as the remaining portions of said center connecting panels.

10. The pick-up truck of claim 8 wherein said center connecting panels are formed with grooves limiting rotational movement of said retainer bracket and said locking knobs to a maximum of approximately ninety degrees.

11. The pick-up truck of claim 8 wherein said one center connecting panel is formed with ramps positioned adjacent said openings to be engaged by said locking knobs when being turned transversely to said openings, said latching mechanism further including an elastomeric O-ring positioned between said locking knob and said retainer bracket to permit compression of said center connecting panels by said latching mechanism.

12. A pivoting cage cargo retainer for use in a vehicle having a cargo bed including a tailgate pivotally mounted thereon for movement between a raised closed position and a lowered open position, comprising:
 a pair of opposing base members pivotally mounted respectively on opposing sides of said cargo bed for rotation about a horizontally disposed transverse pivot through approximately 180 degrees;
 an intermediate panel hingedly mounted on each said base member for horizontal movement relative to said base member; and
 a center connecting panel hingedly mounted on each said intermediate panel for horizontal movement relative to said intermediate panel, said intermediate panel and said center connecting panel being positionable in a storage position against opposing sides of said cargo bed and in a first deployed position extending transversely across said cargo bed, said cage structure being pivotally movable into a second deployed position extending transversely across said tailgate lowered into said open position.

13. The pivoting cage cargo retainer of claim 12 wherein each said center connecting panel terminates in a distal end formed in an overlap region having a thickness approximately half of the remaining portion of the corresponding said center connecting panel so that a joinder of said overlap regions forms a joint having approximately identical thickness as the remaining portions of said center connecting panels.

14. The pivoting cage cargo retainer of claim 13 wherein the overlap region of one of said center connecting panels is formed with a pair of vertically spaced openings while the overlap region of the other of said center connecting panels is formed with insert members corresponding to said openings such that said insert members are engaged into said openings when said center connecting panels are connected.

15. The pivoting cage cargo retainer of claim 14 wherein a latching mechanism joins said overlap regions of said center connecting panels to form said first and second deployed positions.

16. The pick-up truck of claim 15 wherein said latching mechanism is operably associated with said insert members and includes:
 a locking knob mounted on each said insert member to be rotatable relative thereto; and
 a retainer bracket mounted on an opposing side of said insert member from said locking knob, said retainer bracket and said locking knob being rotatable through an arc of approximately ninety degrees for selectively positioning said locking knob transversely of the corresponding said opening to connect said center connecting panels into said deployed positions.

17. The pivoting cage cargo retainer of claim 16 wherein said one center connecting panel is formed with ramps positioned adjacent said openings to be engaged by said locking knobs when being turned transversely to said openings, said latching mechanism further including an elastomeric O-ring positioned between said locking knob and said retainer bracket to permit compression of said center connecting panels by said latching mechanism.

18. A cargo retainer for use on a pick-up truck having a cargo bed on which is pivotally mounted a tailgate movable between a raised closed position and a lowered open position, said cargo bed having a pair of opposing side walls separated by a horizontal floor extending therebetween, said cargo bed including an upright D-pillar positioned at a rear portion of said cargo bed, comprising:
 a cage apparatus formed from at least two upright panels hingedly connected together for movement between a collapsed, inoperable storage position against at least one of said side walls and in a first deployed position extending transversely across said cargo bed, said cage structure being pivotally movable about a transversely oriented pivot into a second deployed position extending transversely across said tailgate lowered into said open position.

19. The cargo retainer of claim 18 wherein said cage apparatus comprises:
 a pair of opposing base members pivotally mounted respectively on opposing side walls for rotation about said pivot through approximately 180 degrees;
 an intermediate panel hingedly mounted on each said base member for horizontal movement relative to said base member;
 a center connecting panel hingedly mounted on each said intermediate panel for horizontal movement relative to said intermediate panel, each said center connecting panel being rotatable against said intermediate panel such that a distal end of said center connecting panel is positioned adjacent said base member when in said storage position, the distal end of each said center connecting panel being formed in an overlap region engagable with the opposing overlap region to join said center connecting panels together to form said deployed positions, the overlap region of one of said center connecting panels being formed with a pair of vertically spaced openings while the overlap region of the other of said center connecting panels is formed with insert members corresponding to said openings such that said insert members are engaged into said openings when said center connecting panels are joined together in said deployed positions; and a latching mechanism for selectively joining together said overlap regions to form said deployed positions.

20. The cargo retainer of claim 19 wherein said latching mechanism includes:

a locking knob mounted on each said insert member to be rotatable relative thereto; and a retainer bracket mounted on an opposing side of said insert member from said locking knob, said retainer bracket and said locking knob being rotatable through an arc of approximately ninety degrees for selectively positioning said locking knob transversely of the corresponding said opening to connect said center connecting panels into said deployed positions;

ramps formed on said one center connecting panel adjacent said openings to be engaged by said locking knobs when being turned transversely to said openings; and an elastomeric O-ring positioned between said locking knob and said retainer bracket to permit compression of said center connecting panels by said latching mechanism.

* * * * *